3,751,445
PREPARATION OF CYANACRYLIC ACID ESTERS
Wolfgang Imoehl, Unna Konigsborn, and Peter Borner, Altlunen, Germany, assignors to Schering AG, Bergkamen, Germany
Filed Jan. 26, 1972, Ser. No. 220,891
Claims priority, application Germany, Feb. 1, 1971, P 21 04 518.1
Int. Cl. C07c 121/02
U.S. Cl. 260—465.4                    3 Claims

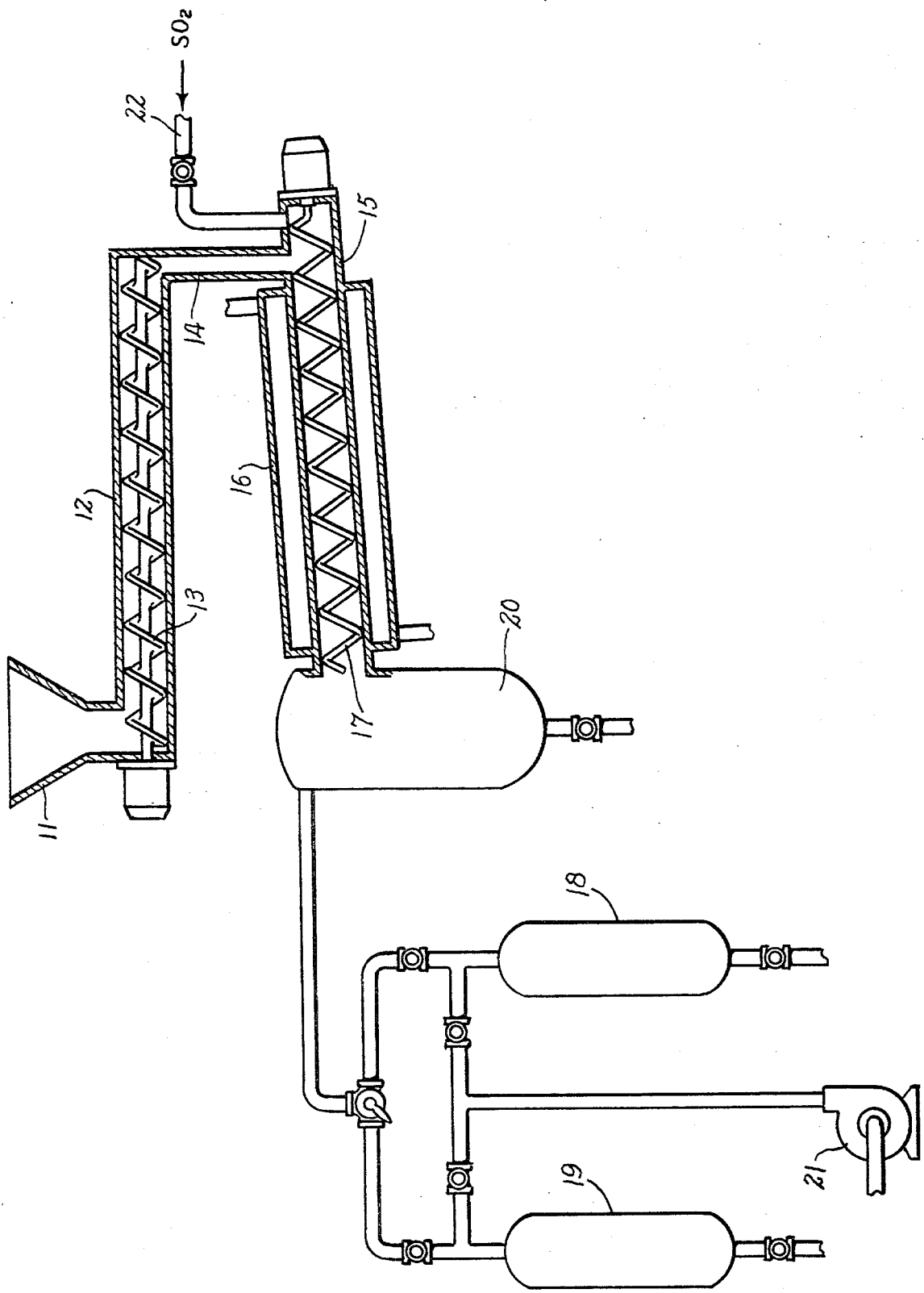

ABSTRACT OF THE DISCLOSURE

Method and apparatus for depolymerizing polycyanacrylates by continuous feeding into a heated depolymerization zone, for example by screw means, with continuous removal of depolymerization residues therefrom, again, for example, by screw means, and with collection of the monomer product in a cooled receiver.

---

The present invention relates to a method and apparatus for the preparation of monomeric cyanacrylic acid esters by the depolymerization of polycyanacrylates in the presence of a polymerization inhibitor.

A feature of the invention is that the deploymerization takes place continuously in a depolymerization zone at a temperature of 150° C.–320° C., preferably from 200° C.–290° C., and at a pressure of 0.5–200 mm. Hg, preferably from 0.5–50 mm. Hg. The reaction mixture is continually introduced into—and depolymerization residues are continuously removed from—the depolymerization zone. The cyanacrylic acid ester product is collected in a cooled receiver.

A further feature of the invention is an apparatus having feeding coils for the movement of material, which coils continually introduce reaction mixture into, and remove depolymerization residues from a depolymerization zone, said apparatus further having a cooled receiver for collection of the cyanacrylic acid ester product.

It is known in the art that monomeric cyanacrylic acid esters can be produced by the depolymerization of polycyanacrylic acid esters. A number of processes are known for the preparation of such polycyanacrylic acid esters. They almost exculsively involve the reaction of cyanacetic acid esters with formaldehyde. Teachings concerning such methods of preparation are to be found, for example, in U.S. Pats. 2,467,927; 2,721,858; or 2,763,677.

According to the processes now known in the art for the depolymerization of polycyanacrylic acid esters, the polymer product is depolymerized by heating in tertiary esters of phosphoric acid in the presence of a polymerization inhibitor.

As inhibitors, those substances are preferably used which hinder both the ionic and the free-radical polymerization of monomeric cyanacrylic acid esters. Such substances are, for example, phosphorus (V) oxide, polyphosphoric acids, antimony (V) oxide, picric acid, hydroquinone, t-butyl pyrocatechol, maleic acid anhydride, iron (III) chloride, sulfur dioxide, nitrogen dioxide, hydrogen fluoride or, more recently, also sultones and anthraquinone disperse dyestuffs.

During the course of the prior art depolymerization process, the temperature of a suspension of the polycyanacrylate in, for example, tricresyl phosphate, is slowly and continuously raised until no more monomer product distills off. However, even for small batches, the decomposition takes a long time.

U.S. Pat. 2,756,251 teaches that the depolymerization of polycyanacrylic acid esters in the absence of tertiary esters of phosphoric acid cannot be carried out in a practical manner. Since the decomposition takes place only very incompletely, a large amount of tar-like and coke-like residues remain after the depolymerization. These residues are additionally increased by the presence of inhibitors such as phosphorus (V) oxide and hydroquinone which are in the depolymerization batch. After each depolymerization, the depolymerization reactor must be cleaned using laborious cleaning methods. Because of the great sensitivity of monomeric cyanacrylic acid esters to impurities, the cleaning of the depolymerization apparatus must be carried out with extreme care. Because of these expensive cleaning methods and the bad depolymerization yields, this method of preparing the esters is extremely uneconomical.

The bad yields which are obtained in such a "bulk depolymerization" of polycyanacrylates are attributable inter alia to the fact that a large amount of the not-yet depolymerized starting material is included in the depolymerization residues.

Also, the tarry residue makes uniform stirring of the starting product—and hence also heat transfer therethrough—considerably more difficult. A uniform temperature cannot be reached in the reaction mixture: the maintenance of a high temperature in the entire depolymerization batch over a long period of time is unavoidable. The uniformity and the purity of the end product obtained by this depolymerization process is subject to considerable variation.

In the method for preparing cyanacrylic acid esters by the depolymerization of polycyanacrylates in the presence of a polymerization inhibitor according to the present invention, the depolymerization takes place continuously at a temperature from 150° C.–320° C., preferably from 200° C.–290° C., under a vacuum of 0.5–200 mm. Hg, preferably 0.5–50 mm. Hg, in a depolymerization zone into which the reaction mixture is continually fed and from which the depolymerization residue is continually removed. The cyanacrylic acid ester product is collected in a cooled receiver.

Surprisingly, polycyanacrylic acid esters can be depolymerized in good yields in the absence of tertiary esters of phosphoric acid according to the process of the invention. This result was not to be expected in view of the teachings of U.S. Pat. 2,756,251.

The difficulties which are encountered in the processes of the prior art with regard to heat transfer are overcome according to the process of the present invention since the reaction mixture can be brought quickly and easily to the desired temperature in the depolymerization zone. The stay times of the product in the depolymerization zone are relatively short, and there is little need for maintaining a high temperature.

The uniformity and the purity of the end product are also considerably improved according to the process of the present invention, whereby the stability and the quality of the product are favorably influenced. Also, the economy of the decomposition process of the invention is considerably increased in comparison with the methods known in the prior art, since the use of tertiary esters of phosphoric acid is eliminated and the numerous interruptions of the depolymerization process for cleaning of the depolymerization apparatus are unnecessary.

For carrying out the method of the present invention, all those arrangements having a reaction zone which can be heated and evacuated, and which permit a continuous introduction of the reaction mixture with continuous removal of the depolymerization residue, are suitable. Those arrangements in which the feed devices, as well as the depolymerization portion, resemble extrusion apparatus have proved particularly suitable.

A better understanding of the present invention and of its many advantages will be had by referring to the accompanying drawing schematically showing apparatus according to the present invention.

A mixture of polycyanacrylate and inhibitor is present in hopper 11. The mixture is fed therefrom into heated extruder 12 by screw 13. In extruder 12, the mixture melts and is then fed, in molten form, through inlet 14 into depolymerization zone 15. In depolymerization zone 15, which is heated to high temperatures, for example by jacket 16, the product is moved by feed coil or spiral 17. Feed coil or spiral 17, which is of a material such as sheet steel or tubular steel bent into the form of a spiral, feeds the product only to the walls of the depolymerization zone. A hollow or cavity remains in the inner portion of the depolymerization zone, through which cavity the monomer formed can be drawn off immediately after formation. The monomer is condensed in cooled receivers 18, 19. Depolymerization residues collect in receiver 20 and may be removed therefrom from time to time, optionally with a screw arrangement (not shown). A partial vacuum is maintained in the apparatus by pump 21. Sulfur dioxide, acting as a polymerization inhibitor, may be intoduced into the system through inlet 22.

This apparatus in part resembles de-gassing extruders in which dosing, de-gassing, and movement of the de-gassed residues are effected with a single screw.

According to this method of depolymerization, cyanacrylic acid esters of the formula

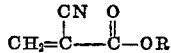

can be prepared, wherein R is phenyl or alkyl, haloalkyl, alkoxyalkyl, alkenyl, or cycloalkyl having up to 16 carbon atoms, preferably lower alkyl having 1 to 4 carbon atoms.

The inhibitors used in the depolymerization method of the invention are those conventionally used in the art and are well known to those skilled in the art.

Although the preparation of polycyanacrylic acid esters does not form part of the present invention, they can, for example, be prepared as follows:

1038 grams of paraformaldehyde, 3430 g. of methanol, and 19 g. of piperidine are brought to the boiling temperature of methanol in a reaction vessel having a reflux condenser, stirrer, and dropping funnel. Subsequently, 3428 g. of cyanacetic acid methyl ester are run into the vessel in small portions. Heating can be discontinued, since the reaction proceeds with the generation of considerable heat. After the addition of the total amount of cyanacetic acid methyl ester, the mixture is held at about 70° C. for an additional two hours. Subsequently, the still-hot solution is poured into shallow vessels. After a few minutes, polycyanacrylic acid methyl ester precipitates so that the covering methanol/water mixture can be decanted. After decanting of the methanol, the polycyanacrylic acid methyl ester is dried under vacuum at 70° C. until the water content is less than 0.3 percent.

A better understanding of the present invention will be had by referring to the following specific example, given by way of illustration.

EXAMPLE

A mixture of 100 parts by weight of polycyanacrylic acid methyl ester, 5 parts by weight of phosphorus (V) oxide, and 5 parts by weight of hydroquinone is placed into a receiver such as hopper 11 in the accompanying drawing. To protect the material from moisture, the container may be shielded from the atmosphere with a "nitrogen curtain."

Extruder 12, whose screw 13 revolves at a rate of 20 r.p.m. is heated to 110° C. in that portion at which the polymer is introduced, to 130° C. in its intermediate portions, and to 150° C. near its exit portion (i.e. near 14). From the extruder, the molten product traverses connector 14, also heated to 150° C., to depolymerization zone 15, which latter is suitably heated to 270° C.

By means of feed spiral 17, which rotates at a rate of 20 r.p.m., the product is moved through the depolymerization zone. Depolymerization residues are led to receiver 20, suitably heated to 180° C., and the monomer vapors are fed to interchangeable receivers 18, 19, cooled to −8° C.

The pressure in depolymerization zone 16 and in condensation vessels 18, 19 is kept at about 3 mm. Hg with vacuum pump 21.

A weak current of sulfur dioxide is introduced as a polymerization inhibitor through inlet 22.

The crude monomer is taken from receivers 18, 19 and further purified by distillation. The yield of pure, distilled, cyanacrylic acid methyl ester is about 60 percent of theory.

What is claimed is:

1. In the method of making a monomeric cyanacrylic acid ester of the formula

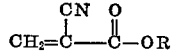

wherein R is phenyl or alkyl, haloalkyl, alkoxyalkyl, alkenyl, or cycloalkyl having up to 16 carbon atoms, by depolymerizing a corresponding polycyanacrylate in the presence of a polymerization inhibitor hindering polymerization of the depolymerized monomers, at a temperature from 150° C. to 320° C. and at a pressure from 0.5 to 200 mm. Hg, the improvement which comprises continuously introducing the polycyanacrylate into an elongated depolymerization zone having walls heated to the aforesaid temperature, continuously moving the introduced material through said depolymerization zone in contact with the walls thereof, continuously removing depolymerization residues and monomeric ester vapors produced in said depolymerization zone from said zone, and condensing said vapors of monomeric ester.

2. The method as in claim 1 wherein the depolymerization temperature is from 200° C.–290° C.

3. The method as in claim 1 wherein the depolymerization pressure is 0.5–50 mm. Hg.

References Cited

UNITED STATES PATENTS

| | | | |
|---|---|---|---|
| 3,639,361 | 2/1972 | Robertson et al. | 260—465.4 X |
| 3,465,027 | 9/1969 | Hawkins | 260—465.4 X |
| 2,912,454 | 11/1959 | McKeever | 260—465.4 |
| 2,784,215 | 3/1957 | Joyner | 260—465.4 |

JOSEPH P. BRUST, Primary Examiner

U.S. Cl. X.R.

260—464, 465 D; 23—252 R, 284, 285